United States Patent
Smith

(10) Patent No.: US 8,446,321 B2
(45) Date of Patent: May 21, 2013

(54) DEPLOYABLE INTELLIGENCE AND TRACKING SYSTEM FOR HOMELAND SECURITY AND SEARCH AND RESCUE

(75) Inventor: Alexander E. Smith, McLean, VA (US)

(73) Assignee: Omnipol A.S. (CZ)

( * ) Notice: Subject to any disclaimer, the term of this patent is extended or adjusted under 35 U.S.C. 154(b) by 1732 days.

(21) Appl. No.: 11/649,350

(22) Filed: Jan. 3, 2007

(65) Prior Publication Data

US 2013/0093625 A1   Apr. 18, 2013

Related U.S. Application Data

(63) Continuation-in-part of application No. 11/492,711, filed on Jul. 25, 2006, and a continuation-in-part of application No. 11/429,926, filed on May 8, 2006, and a continuation-in-part of application No. 11/343,079, filed on Jan. 30, 2006, and a continuation-in-part of application No. 11/342,289, filed on Jan. 28, 2006, and a continuation-in-part of application No. 11/209,030, filed on Aug. 22, 2005, now Pat. No. 7,248,219, and a continuation-in-part of application No. 11/257,416, filed on Oct. 24, 2005, and a continuation-in-part of application No. 11/203,823, filed on Aug. 15, 2005, and a continuation-in-part of application No. 11/145,170, filed on Jun. 6, 2005, which is a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, which is a continuation-in-part of application No. 10/319,725, filed on Dec. 16, 2002, now Pat. No. 6,812,890.

(60) Provisional application No. 60/123,170, filed on Mar. 5, 1999, provisional application No. 60/440,618, filed on Jan. 17, 2003.

(51) Int. Cl.
*G01S 3/02* (2006.01)

(52) U.S. Cl.
USPC .......................................... 342/465; 342/457

(58) Field of Classification Search
USPC .......... 342/442, 455–457, 463, 465; 701/117, 701/120
See application file for complete search history.

(56) References Cited

U.S. PATENT DOCUMENTS

| 1,738,571 A | 12/1929 | Gare | 404/18 |
| 3,668,403 A | 6/1972 | Meilander | 701/121 |

(Continued)

FOREIGN PATENT DOCUMENTS

| DE | 4306660 A1 | 8/1974 |
| DE | 4204164 A1 | 8/1993 |

(Continued)

OTHER PUBLICATIONS

PCL system with illuminator of opportunity, Huaiying tan, Min ren, Bo lie, Jinning Song, Beijing Radar Instiitute, IEEE 0-7803-9582-4/06, Apr. 2006.

(Continued)

*Primary Examiner* — Dao Phan
(74) *Attorney, Agent, or Firm* — Ostrolenk Faber LLP

(57) ABSTRACT

This invention builds on previous industry techniques to correlate data from a variety of sources for the purposes of tracking and identifying aircraft, vehicles, and marine vessels in real time over a variety of different areas including oceans and mountainous terrain. Passive broadband tracking of aircraft emitters, and electronic fingerprinting of emitters, correlated with audio, video, infrared, primary radar and other information is employed to provide a comprehensive assessment of an aircraft's position, track and identification for a variety of applications including homeland security and search and rescue.

24 Claims, 10 Drawing Sheets

U.S. PATENT DOCUMENTS

| | | | |
|---|---|---|---|
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 342/450 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,694,322 A | 12/1997 | Westerlage et al. | 364/464.27 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,314 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouce et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,147,748 A | 11/2000 | Hughes | 356/4.09 |
| 6,161,097 A | 12/2000 | Glass et al. | 705/6 |
| 6,178,363 B1 | 1/2001 | McIntyre et al. | 701/16 |
| 6,188,937 B1 | 2/2001 | Sherry et al. | 701/14 |
| 6,194,040 B1 | 2/2001 | Delius et al. | 342/357.12 |
| 6,195,609 B1 | 2/2001 | Pilley | 701/120 |
| 6,201,499 B1 * | 3/2001 | Hawkes et al. | 342/387 |
| 6,208,284 B1 | 3/2001 | Woodell et al. | 342/30 |
| 6,208,937 B1 | 3/2001 | Huddle | 701/221 |
| 6,211,811 B1 | 4/2001 | Evers | 342/36 |
| 6,219,592 B1 | 4/2001 | Muller et al. | 701/9 |

| Patent | Date | Inventor | Class |
|---|---|---|---|
| 6,222,480 B1 | 4/2001 | Kuntman et al. | 342/30 |
| 6,225,942 B1 | 5/2001 | Alon | 342/59 |
| 6,230,018 B1 | 5/2001 | Watters et al. | 455/456 |
| 6,233,522 B1 | 5/2001 | Morici | 701/208 |
| 6,239,739 B1 | 5/2001 | Thomson et al. | 342/96 |
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,282,487 B1 | 8/2001 | Shiomi et al. | 701/120 |
| 6,282,488 B1 | 8/2001 | Castor et al. | 701/120 |
| 6,289,280 B1 | 9/2001 | Fernandez-Corbaton | 701/214 |
| 6,292,721 B1 | 9/2001 | Conner et al. | 701/9 |
| 6,311,127 B1 | 10/2001 | Stratton et al. | 701/213 |
| 6,314,361 B1 | 11/2001 | Yu et al. | 701/120 |
| 6,314,363 B1 | 11/2001 | Pilley et al. | 701/120 |
| 6,317,663 B1 | 11/2001 | Meunier et al. | 701/16 |
| 6,321,091 B1 | 11/2001 | Holland | 455/456 |
| 6,327,471 B1 | 12/2001 | Song | 455/440 |
| 6,329,947 B2 | 12/2001 | Smith | 342/418 |
| 6,337,652 B1 | 1/2002 | Shiomi et al. | 342/37 |
| 6,338,011 B1 | 1/2002 | Furst et al. | 701/1 |
| 6,339,745 B1 | 1/2002 | Novik | 701/208 |
| 6,340,935 B1 | 1/2002 | Hall | 340/932.2 |
| 6,340,947 B1 | 1/2002 | Chang et al. | 342/357.01 |
| 6,344,820 B1 | 2/2002 | Shiomi et al. | 342/174 |
| 6,347,263 B1 | 2/2002 | Johnson et al. | 701/14 |
| 6,348,856 B1 | 2/2002 | Jones et al. | 340/10.1 |
| 6,366,240 B1 | 4/2002 | Timothy et al. | 342/417 |
| 6,377,208 B2 | 4/2002 | Chang et al. | 342/357.01 |
| 6,380,869 B1 | 4/2002 | Simon et al. | 340/945 |
| 6,380,870 B1 | 4/2002 | Conner et al. | 340/970 |
| 6,384,783 B1 | 5/2002 | Smith et al. | 342/387 |
| 6,393,359 B1 | 5/2002 | Flynn et al. | 701/120 |
| 6,396,435 B1 | 5/2002 | Fleischhauer et al. | 342/70 |
| 6,408,233 B1 | 6/2002 | Solomon et al. | 701/35 |
| 6,414,629 B1 | 7/2002 | Curcio | 342/357.08 |
| 6,415,219 B1 | 7/2002 | Degodyuk | 70/117 |
| 6,420,993 B1 | 7/2002 | Varon | 342/36 |
| 6,445,310 B1 | 9/2002 | Bateman et al. | 340/970 |
| 6,445,927 B1 | 9/2002 | Kng et al. | 455/456 |
| 6,448,929 B1 | 9/2002 | Smith et al. | 342/456 |
| 6,459,411 B2 | 10/2002 | Frazier et al. | 342/455 |
| 6,462,674 B2 | 10/2002 | Ohmura et al. | 340/901 |
| 6,463,383 B1 | 10/2002 | Baiada et al. | 701/120 |
| 6,469,654 B1 | 10/2002 | Winner et al. | 342/33 |
| 6,469,655 B1 | 10/2002 | Franke et al. | 342/36 |
| 6,469,664 B1 | 10/2002 | Michaelson et al. | 342/357.13 |
| 6,473,027 B1 | 10/2002 | Alon | 342/37 |
| 6,473,694 B1 | 10/2002 | Akopian et al. | 701/213 |
| 6,477,449 B1 | 11/2002 | Conner et al. | 701/4 |
| 6,492,932 B1 | 12/2002 | Jin et al. | 342/25 |
| 6,493,610 B1 | 12/2002 | Ezaki | 701/3 |
| 6,504,490 B2 | 1/2003 | Mizushima | 340/943 |
| 6,518,916 B1 | 2/2003 | Ashihara et al. | 342/70 |
| 6,522,295 B2 | 2/2003 | Baugh et al. | 342/453 |
| 6,531,978 B2 | 3/2003 | Tran | 342/29 |
| 6,542,809 B2 | 4/2003 | Hehls, III | 701/120 |
| 6,542,810 B2 | 4/2003 | Lai | 701/120 |
| 6,545,631 B2 | 4/2003 | Hudson et al. | 342/30 |
| 6,549,829 B1 | 4/2003 | Anderson et al. | 701/16 |
| 6,563,432 B1 | 5/2003 | Millgard | 340/961 |
| 6,567,043 B2 | 5/2003 | Smith et al. | 342/450 |
| 6,571,155 B2 | 5/2003 | Carriker et al. | 701/3 |
| 6,584,400 B2 | 6/2003 | Beardsworth | 701/120 |
| 6,584,414 B1 | 6/2003 | Green et al. | 702/33 |
| 6,587,079 B1 | 7/2003 | Rickard et al. | 342/387 |
| 6,606,034 B1 | 8/2003 | Muller et al. | 340/970 |
| 6,606,563 B2 | 8/2003 | Corcoran, III | 701/301 |
| 6,615,648 B1 | 9/2003 | Ferguson et al. | 73/146 |
| 6,617,997 B2 | 9/2003 | Ybarra et al. | 342/29 |
| 6,618,008 B1 | 9/2003 | Scholz | 342/427 |
| 6,633,259 B1 | 10/2003 | Smith et al. | 342/456 |
| 6,657,578 B2 | 12/2003 | Stayton | 342/30 |
| 6,680,687 B2 | 1/2004 | Phelipot | 342/29 |
| 6,690,295 B1 | 2/2004 | De Boer | 340/951 |
| 6,690,618 B2 | 2/2004 | Tomasi et al. | 367/127 |
| 6,691,004 B2 | 2/2004 | Johnson | 701/14 |
| 6,707,394 B2 | 3/2004 | Ishihara et al. | 340/970 |
| 6,710,719 B1 | 3/2004 | Jones et al. | 340/825.49 |
| 6,710,723 B2 | 3/2004 | Muller | 340/970 |
| 6,714,782 B1 | 3/2004 | Monot et al. | 455/431 |
| 6,721,652 B1 | 4/2004 | Sanqunetti | 701/207 |
| 6,744,396 B2 | 6/2004 | Stone et al. | 342/36 |
| 6,750,815 B2 | 6/2004 | Michaelson et al. | 342/357.13 |
| 6,751,545 B2 | 6/2004 | Walter | 701/120 |
| 6,760,387 B2 | 7/2004 | Langford et al. | 375/267 |
| 6,765,533 B2 | 7/2004 | Szajnowski | 342/465 |
| 6,789,011 B2 | 9/2004 | Baiada et al. | 701/120 |
| 6,789,016 B2 | 9/2004 | Bayh et al. | 701/301 |
| 6,792,058 B1 | 9/2004 | Hershey et al. | 375/347 |
| 6,798,381 B2 | 9/2004 | Benner et al. | 342/450 |
| 6,799,114 B2 | 9/2004 | Etnyre | 701/120 |
| 6,801,152 B1 | 10/2004 | Rose | 342/13 |
| 6,801,155 B2 | 10/2004 | Jahangir et al. | 342/90 |
| 6,809,679 B2 | 10/2004 | LaFrey et al. | 342/37 |
| 6,810,329 B2 | 10/2004 | Koga | 701/211 |
| 6,812,890 B2 | 11/2004 | Smith et al. | 342/454 |
| 6,816,105 B2 | 11/2004 | Winner et al. | 342/37 |
| 6,819,282 B1 | 11/2004 | Galati et al. | 342/37 |
| 6,823,188 B1 | 11/2004 | Stern | 455/456.1 |
| 6,828,921 B2 | 12/2004 | Brown et al. | 340/945 |
| 6,845,362 B2 | 1/2005 | Furuta et al. | 705/13 |
| 6,861,982 B2 | 3/2005 | Forstrom et al. | 342/387 |
| 6,862,519 B2 | 3/2005 | Walter | 701/120 |
| 6,862,541 B2 | 3/2005 | Mizushima | 702/26 |
| 6,865,484 B2 | 3/2005 | Miyasaka et al. | 701/213 |
| 6,873,269 B2 | 3/2005 | Tran | 340/961 |
| 6,873,903 B2 | 3/2005 | Baiada et al. | 701/120 |
| 6,876,859 B2 | 4/2005 | Anderson et al. | 455/456.1 |
| 6,882,930 B2 | 4/2005 | Trayford et al. | 701/117 |
| 6,885,340 B2 | 4/2005 | Smith et al. | 342/465 |
| 6,900,760 B2 | 5/2005 | Groves | 342/357.14 |
| 6,912,461 B2 | 6/2005 | Poreda | 701/120 |
| 6,927,701 B2 | 8/2005 | Schmidt et al. | 340/959 |
| 6,930,638 B2 | 8/2005 | Lloyd et al. | 342/453 |
| 6,952,631 B2 | 10/2005 | Griffith et al. | 701/13 |
| 6,963,304 B2 | 11/2005 | Murphy | 342/357.02 |
| 6,967,616 B2 | 11/2005 | Etnyre | 342/182 |
| 6,977,612 B1 | 12/2005 | Bennett | 342/357.07 |
| 6,985,103 B2 | 1/2006 | Ridderheim et al. | 342/30 |
| 6,985,743 B2 | 1/2006 | Bajikar | 455/456.1 |
| 6,992,626 B2 | 1/2006 | Smith | 342/454 |
| 7,006,032 B2 | 2/2006 | King et al. | 342/29 |
| 7,012,552 B2 | 3/2006 | Baugh et al. | 340/945 |
| 7,026,987 B2 | 4/2006 | Lokshin et al. | 342/357.12 |
| 7,030,780 B2 | 4/2006 | Shiomi et al. | 340/961 |
| 7,043,355 B2 | 5/2006 | Lai | 701/120 |
| 7,050,909 B2 | 5/2006 | Nichols et al. | 701/301 |
| 7,053,792 B2 | 5/2006 | Aoki et al. | 340/928 |
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |

| | | | |
|---|---|---|---|
| 7,218,276 B2 | 5/2007 | Teranishi | 342/357.1 |
| 7,218,278 B1 | 5/2007 | Arethens | 342/367.03 |
| 7,221,308 B2 | 5/2007 | Burton et al. | 342/42 |
| 7,228,207 B2 | 6/2007 | Clarke et al. | 701/3 |
| 7,233,545 B2 | 6/2007 | Harvey, Jr. et al. | 367/127 |
| 7,248,963 B2 | 7/2007 | Baiada et al. | 701/120 |
| 7,250,901 B2 | 7/2007 | Stephens | 342/146 |
| 7,257,469 B1 | 8/2007 | Pemble | 701/3 |
| 7,272,495 B2 | 9/2007 | Coluzzi et al. | 701/207 |
| 7,277,052 B2 | 10/2007 | Delaveau et al. | 342/387 |
| 7,286,624 B2 | 10/2007 | Woo et al. | 375/356 |
| 7,307,578 B2 | 12/2007 | Blaskovich et al. | 342/29 |
| 7,308,343 B1 | 12/2007 | Horvath et al. | 701/3 |
| 7,321,813 B2 | 1/2008 | Meunier | 701/10 |
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2001/0046870 A1* | 11/2001 | Stilp et al. | 455/456 |
| 2002/0021247 A1 | 2/2002 | Smith et al. | 342/450 |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0009267 A1 | 1/2003 | Dunsky et al. | 701/4 |
| 2003/0060941 A1 | 3/2003 | Griffith et al. | 701/3 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shing-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0287473 A1* | 12/2007 | Dupray | 455/456.1 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |
| 2008/0186224 A1 | 8/2008 | Ichiyanagi et al. | 342/109 |
| 2008/0186231 A1 | 8/2008 | Aljadeff et al. | 342/387 |
| 2008/0195309 A1 | 8/2008 | Prinzel, III et al. | 701/208 |
| 2008/0231494 A1 | 9/2008 | Galati | 342/37 |
| 2008/0252528 A1 | 10/2008 | Shen et al. | 342/451 |
| 2008/0266166 A1 | 10/2008 | Schuchman | 342/97 |
| 2008/0272227 A1 | 11/2008 | Sharpe | 244/3.16 |
| 2008/0275642 A1 | 11/2008 | Clark et al. | 701/208 |
| 2008/0294306 A1 | 11/2008 | Huynh et al. | 701/3 |
| 2008/0297398 A1 | 12/2008 | Kamimura | 342/38 |
| 2009/0005960 A1 | 1/2009 | Roberts et al. | 701/120 |
| 2009/0009357 A1 | 1/2009 | Heen et al. | 340/825.09 |
| 2009/0012660 A1 | 1/2009 | Roberts et al. | 701/3 |
| 2009/0012661 A1 | 1/2009 | Louis | 701/9 |
| 2009/0015471 A1 | 1/2009 | Shen et al. | 342/357.15 |
| 2009/0027270 A1 | 1/2009 | Fisher et al. | 342/387 |
| 2009/0051570 A1 | 2/2009 | Clark et al. | 340/971 |
| 2009/0055038 A1 | 2/2009 | Garrec et al. | 701/17 |

FOREIGN PATENT DOCUMENTS

| | | |
|---|---|---|
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0346461 A1 | 12/1989 |
| EP | 0466239 | 1/1992 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |

| | | | | | | |
|---|---|---|---|---|---|---|
| EP | 0355336 | B1 | 8/1995 | FR | 2791778 A1 | 10/2000 |
| EP | 0670566 | A2 | 9/1995 | FR | 2881841 A1 | 8/2006 |
| EP | 0682332 | A1 | 11/1995 | JP | 9-288175 A | 11/1994 |
| EP | 0505827 | B1 | 6/1996 | JP | 6-342061 A | 12/1994 |
| EP | 0385600 | B1 | 7/1996 | JP | 8-146130 A | 5/1996 |
| EP | 0732596 | A2 | 9/1996 | JP | 9-119983 A | 11/1996 |
| EP | 0487940 | B1 | 1/1997 | WO | WO9205456 A1 | 4/1992 |
| EP | 0774148 | A1 | 5/1997 | WO | WO 94/14251 | 6/1994 |
| EP | 0578316 | B1 | 4/1998 | WO | WO9427161 A1 | 11/1994 |
| EP | 0915349 | A1 | 5/1999 | WO | WO9428437 A1 | 12/1994 |
| EP | 1022580 | A3 | 2/2001 | WO | WO9503598 A1 | 2/1995 |
| EP | 1118871 | A2 | 7/2001 | WO | WO9521388 A1 | 8/1995 |
| EP | 0877997 | B1 | 12/2001 | WO | WO9605562 A1 | 2/1996 |
| EP | 0778470 | B1 | 5/2002 | WO | WO9635961 A1 | 11/1996 |
| EP | 1202233 | A1 | 5/2002 | WO | WO9726552 A2 | 7/1997 |
| EP | 0865004 | B1 | 7/2002 | WO | WO9747173 A2 | 12/1997 |
| EP | 1109032 | B1 | 3/2003 | WO | WO9804965 A2 | 2/1998 |
| EP | 1300689 | A2 | 4/2003 | WO | WO9805977 A1 | 2/1998 |
| EP | 1331620 | A1 | 7/2003 | WO | WO9814926 A1 | 4/1998 |
| EP | 1345044 | A1 | 9/2003 | WO | WO9822834 A1 | 5/1998 |
| EP | 1369704 | A1 | 12/2003 | WO | WO9822923 A1 | 5/1998 |
| EP | 1302920 | B1 | 2/2004 | WO | WO9835311 A1 | 8/1998 |
| EP | 1396832 | A1 | 3/2004 | WO | WO9843107 A1 | 10/1998 |
| EP | 1406228 | A2 | 4/2004 | WO | WO9849654 A1 | 11/1998 |
| EP | 1070968 | B1 | 5/2004 | WO | WO9908251 A1 | 2/1999 |
| EP | 1431946 | A1 | 6/2004 | WO | WO9935630 A1 | 7/1999 |
| EP | 1467575 | A1 | 10/2004 | WO | WO9942855 A1 | 8/1999 |
| EP | 1471365 | | 10/2004 | WO | WO9945519 A2 | 9/1999 |
| EP | 0903589 | B1 | 11/2004 | WO | WO 99/50985 | 10/1999 |
| EP | 1517281 | A2 | 3/2005 | WO | WO9950985 | 10/1999 |
| EP | 1531340 | A1 | 5/2005 | WO | WO9956144 A1 | 11/1999 |
| EP | 0926510 | B1 | 8/2005 | WO | WO0023816 A1 | 4/2000 |
| EP | 1405286 | B1 | 9/2005 | WO | WO0039775 A2 | 7/2000 |
| EP | 1485730 | B1 | 9/2005 | WO | WO0111389 A1 | 2/2001 |
| EP | 1428195 | B1 | 10/2005 | WO | WO0133302 A2 | 5/2001 |
| EP | 1603098 | A1 | 12/2005 | WO | WO0148652 A1 | 7/2001 |
| EP | 1125415 | B1 | 1/2006 | WO | WO0157550 A1 | 8/2001 |
| EP | 1205732 | B1 | 3/2006 | WO | WO0159601 A1 | 8/2001 |
| EP | 1632787 | A1 | 3/2006 | WO | WO0163239 A1 | 8/2001 |
| EP | 1632892 | A2 | 3/2006 | WO | WO0165276 A1 | 9/2001 |
| EP | 0953261 | B1 | 6/2006 | WO | WO0186319 | 11/2001 |
| EP | 1275975 | B1 | 6/2006 | WO | WO 0186319 | 11/2001 |
| EP | 1285232 | B1 | 6/2006 | WO | WO0194969 A2 | 12/2001 |
| EP | 1672384 | A2 | 6/2006 | WO | WO0205245 A2 | 1/2002 |
| EP | 0987562 | B1 | 7/2006 | WO | WO0208784 A1 | 1/2002 |
| EP | 1093564 | B1 | 11/2006 | WO | WO0215151 A1 | 2/2002 |
| EP | 1218694 | B1 | 11/2006 | WO | WO0227275 A2 | 4/2002 |
| EP | 1727094 | A2 | 11/2006 | WO | WO02054103 A2 | 7/2002 |
| EP | 1742170 | A1 | 1/2007 | WO | WO02059838 A2 | 8/2002 |
| EP | 1188137 | B1 | 2/2007 | WO | WO02066288 A1 | 8/2002 |
| EP | 1755356 | A1 | 2/2007 | WO | WO02069300 A1 | 9/2002 |
| EP | 1463002 | B1 | 4/2007 | WO | WO02075667 A1 | 9/2002 |
| EP | 1361555 | B1 | 5/2007 | WO | WO02091312 A1 | 11/2002 |
| EP | 1798572 | A1 | 6/2007 | WO | WO02095709 A2 | 11/2002 |
| EP | 1410364 | B1 | 10/2007 | WO | WO02099769 | 12/2002 |
| EP | 1843161 | A2 | 10/2007 | WO | WO03013010 A1 | 2/2003 |
| EP | 1860456 | A1 | 11/2007 | WO | WO03016937 A1 | 2/2003 |
| EP | 1884462 | A1 | 2/2008 | WO | WO03023439 A2 | 3/2003 |
| EP | 1101385 | B1 | 3/2008 | WO | WO03027934 A1 | 4/2003 |
| EP | 1901090 | A1 | 3/2008 | WO | WO03054830 A2 | 7/2003 |
| EP | 0964268 | B1 | 4/2008 | WO | WO03056495 A1 | 7/2003 |
| EP | 1483755 | B1 | 4/2008 | WO | WO03060855 A1 | 7/2003 |
| EP | 1906204 | A2 | 4/2008 | WO | WO03067281 A1 | 8/2003 |
| EP | 1912077 | A2 | 4/2008 | WO | WO03079136 A2 | 9/2003 |
| EP | 1331490 | B1 | 6/2008 | WO | WO03081560 A1 | 10/2003 |
| EP | 1942351 | A1 | 7/2008 | WO | WO03093775 A2 | 11/2003 |
| EP | 1327159 | B1 | 8/2008 | WO | WO03096282 A1 | 11/2003 |
| EP | 1436641 | B1 | 8/2008 | WO | WO03098576 A1 | 11/2003 |
| EP | 1953565 | A1 | 8/2008 | WO | WO03107299 A2 | 12/2003 |
| EP | 1483902 | B1 | 9/2008 | WO | WO2004042418 A1 | 5/2004 |
| EP | 1965219 | A1 | 9/2008 | WO | WO2004068162 A2 | 8/2004 |
| EP | 1972962 | A2 | 9/2008 | WO | WO2004109317 A2 | 12/2004 |
| EP | 1975884 | A1 | 10/2008 | WO | WO2004114252 A1 | 12/2004 |
| EP | 1118011 | B1 | 11/2008 | WO | WO2005017555 A2 | 2/2005 |
| EP | 1995708 | A1 | 11/2008 | WO | WO2005038478 A2 | 4/2005 |
| EP | 2000778 | A2 | 12/2008 | WO | WO2005052887 A1 | 6/2005 |
| EP | 2001004 | A2 | 12/2008 | WO | WO2005081012 A1 | 9/2005 |
| EP | 2023155 | A1 | 2/2009 | WO | WO2005081630 A2 | 9/2005 |
| FR | 2708349 | A1 | 2/1995 | WO | WO2005114613 A1 | 12/2005 |

| | | | |
|---|---|---|---|
| WO | WO2005121701 A2 | 12/2005 |
| WO | WO2006070207 A1 | 7/2006 |
| WO | WO2006079165 A1 | 8/2006 |
| WO | WO2006088554 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.
Denial of bistatic hosting by spatial-temporal waveform design; H.D. Griffiths, M.G. Wicks, D. Weinder, R. Adve, P.A. Antonik, and I. Fotinopoulos, IEE Proc. Radar Sonar Navig., vol. 152, No. 2, Apr. 2005.
Passive coherent location FPGA implementation of the cross ambiguity function; Kvasnicka, M. Hermanek, A. Kunes, M. Pelant, M. Plsek, R., Proceedings—SPIE the International Society for Optical Engineering; 2006, vol. 6159; Part 1, pp. 615918; International Society for Optical Engineering.
Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek *Technical Univ. of Pardubice* (Czech Republic).
World Airport Week, "Sharing Makes the Airport Go Round" Jan. 21, 1997, p. 1.
Huaiying Tan et al. *PCL System With Illuminator of Opportunity* Proceedings of 2006 CIE International Conference on Radar, vol. 1,Oct. 16, 2006.
Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005. Jafargholi et al, *High Accurate Multiple Target Detection in PCL Radar Systems*, RADAR, 2006, CIE '06. International Conference on, IEEE, PI, Oct. 1, 2006.
Terminal, Landing Fees Increase, Dianne Gouliquer, Northern Ontario Business, Sudbury, Apr. 1, 2001, vol. 21, Issue 6, p. 24.
Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.
Transtech Airport Solutions, Inc., http://www.transtech-solutions.com/products/asm/airport.html, Feb. 12, 2009.
Eurocontrol Standard Document for Surveillance Interchange Part 14: Category 020, Multilateration Target Reports, SUR.ET1.ST05. 2000-STD-14-02, Apr. 2008.
ATO Advanced Technology Development and Prototyping Group, http://222.faa.gov/about/office_org/headquarters_offices/ato/service_units/operations/td/.. Jan. 16, 2008.
Form B—Proposal Summary, NASA SBIR 02-1 Solicitation, http://sbir.nasa.gov/SBIR/abstracts/02/sbir/phase1/SBIR-02-1-A3.01-9714.html Sep. 5, 2002.
Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.
NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.
Airport Pavement Management Systems: An Appraisal of Erxisting Methodologies, Michel Gendreau and Patrrick Soriano;Pergamon Transn Res. A, vol. 32, No. 3, pp. 187-214, 1998.
*Components of a Pavement Maintenance Management System*, Mohamed Y. Shahin, U.S. Army Construction Engineering Research Laboratory, Transportaiton Research Record 791, pp. 31-39, 1980.
*Application of Markov Process to Pavement Management Systems at the Network Level*, Abbas Ahmad Butt, University of Illinois at Urbana-Champaign (1991).
Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.
Traffic Alert System Technical Design Summary, Final Report, Apr. 1994 (Baldwin et al.).
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic for Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.
M.L. Wood and R. W. Bush, "Multilateration on Mode S and ATCRBS Signals at Atlanta's Hartsfield Airport", Lincoln Laboratory, M.I.T., Jan. 8, 1998.
AERMOD: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Cutomers Worldwide", Apr. 28, 2003, http://www.flightexplorer/com/News/press%20releases/pr042803. asp.
Source Code received by Rannoch Corp. from FAA, circa 1998.
"A Routine that converts an American Mode S address into its corresponding 'N' number string", Ken Banis, Feb. 17, 1992/.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) for Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Rake Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

ASA Masps—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA Masps—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA Masps—Change Issue, Taji Shafaat, Sep. 19, 2004.
ASA MASPS—Change Issue, Stuart Searight, Nov. 3, 2004.

A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

Draft Proposal for the Amendment of the Sub-Cap on Off-Peak Takeoff and Landing Charges At Dublin Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending GAO/RCED-98-226, Jul. 1998.

Albany International Airport Pavement Management System, Albany, New York, Albany International Airport GIS-Based Pavement and Facilities Management , Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches a Unique Solution for ADS-B,. Jan. 19, 2005, Raytheon Corp. http://www.raytheon.co.uk/highlands/ATMS.html.

Raytheon Systems Limited'S ADS-B Solution Prized by International Air Traffic Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.

Federal Airways & Airspace, Inc. Because Accuracy Matters, Feb. 2003, Jan. 2002.

VDL4 TM Alignment With DO-242A (RTCA ADS-B MASPS) WG51/SG2, NASA, Sep. 2003.

Method to Provide System-Wide ADS-B Back-Up, Validation, and Security, A. Smith et al. 25$^{th}$ AIAA/IEEE Digital Avionics Systems Conference, Oct. 15, 2006.

*Positive Identification of Aircraft on Surface Movement Area—Results of FAA Trials*, 10th Annual International AeroSense Symposium, Orlando, Florida, Apr. 1996.

*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17$^{th}$ Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke RADAR, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, 148$^{th}$ Meeting of the Acoustical Society of America, http://pcfite.ing.uniroma1.it/upload/research/4psp711079482021710.pdf Nov. 2004.

*Cel-Loc How We Do it, Technology Overview*, http://www.cell-loc.com/how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods to Provide System-Wide ADS-B Back-Up, Validation and Security*, A. Smith, R. Cassell, T. Breen, R. Hulstrom, C. Evers, 25$^{th}$ AIAA/IEEE Digital Avionics Systems Conference, Oct. 15, 2006.

Damarel Systems International, Ltd, Travel Automation Specialists, © 2004, www.dameral.com.

Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.

*The Twilight Zone, Can Wide-Area Multilateration Systems Become a Nightmare for MSSR Producers?* Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, SIEMENS, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Published in Professional Pilot Magazine, Jun. 1999.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, Aug. 1998.

"Runway Incursion Reduction Program Dallas—Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

\* cited by examiner

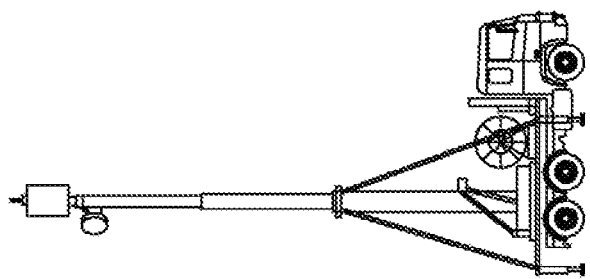
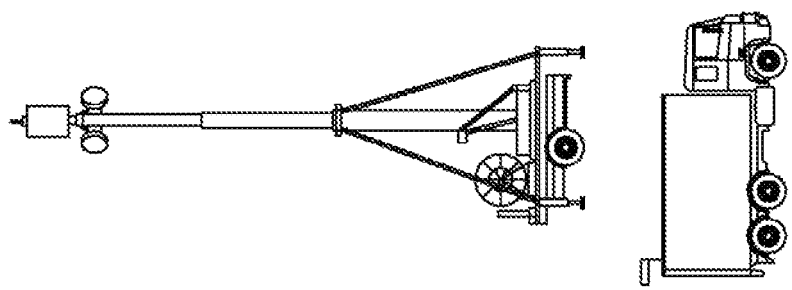
FIG. 5 (Prior Art)
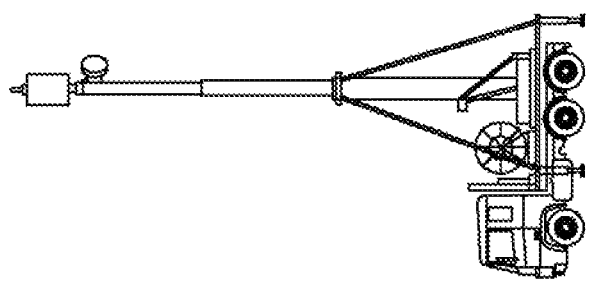

DEPLOYABLE INTELLIGENCE AND TRACKING SYSTEM FOR HOMELAND SECURITY AND SEARCH AND RESCUE

CROSS-REFERENCE TO RELATED APPLICATIONS

This application is a Continuation-In-Part of U.S. patent application Ser. No. 11/492,711, filed Jul. 25, 2006, and incorporated herein by reference; This application is a Continuation-In-Part of U.S. patent application Ser. No. 11/429,926, filed on May 8, 2006, and incorporated herein by reference; This application is a Continuation-In-Part of U.S. patent application Ser. No. 11/343,079, filed on Jan. 30, 2006, and incorporated herein by reference; This application is also a Continuation-In-Part of U.S. patent application Ser. No. 11/342,289 filed Jan. 28, 2006 and incorporated herein by reference; This application is a Continuation-In-Part of U.S. patent application Ser. No. 11/209,030, filed on Aug. 22, 2005, and incorporated herein by reference; This application is a Continuation-In-Part of U.S. patent application Ser. No. 11/257,416, filed on Oct. 24, 2005, and incorporated herein by reference; This application is a Continuation-In-Part of U.S. patent application Ser. No. 11/203,823 filed Aug. 15, 2005 and incorporated herein by reference; This application is a Continuation-In-Part of U.S. patent application Ser. No. 11/145,170 filed on Jun. 6, 2005 and incorporated herein by reference; application Ser. No. 11/145,170 is a Continuation-In-Part of U.S. patent application Ser. No. 10/743,042 filed Dec. 23, 2003 and incorporated herein by reference; application Ser. No. 10/743,042 is a Continuation-In-Part of U.S. patent application Ser. No. 10/638,524 filed Aug. 12, 2003 and incorporated herein by reference; application Ser. No. 10/638,524 is a Continuation of U.S. patent application Ser. No. 09/516,215 filed Feb. 29, 2000 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 and incorporated herein by reference. application Ser. No. 10/743,042 is a Non Prov. of Provisional U.S. patent application Ser. No. 60/440,618 filed Jan. 17, 2003 and incorporated herein by reference.

FIELD OF THE INVENTION

The invention relates to the field of aircraft and ground vehicle tracking and surveillance. In particular, the present invention is directed towards a deployable intelligence and tracking system for homeland security and search and rescue.

BACKGROUND OF THE INVENTION

Passive Broadband Tracking may include triangulation or multilateration systems using time difference of arrival (TDOA) processing to track aircraft in local, regional and wide areas. These systems generally need pulse transmissions from the aircraft, which have sufficiently fast rise times in order to make a consistent time reference on the signal. Pulse transmission systems, having sufficiently fast rise times are generally higher frequency signals, L-band or above (generally higher than 900 MHz), with sufficient bandwidth to provide the fast rise time needed for passive broadband tracking. Signals with sufficient frequency and bandwidth include secondary surveillance radar systems (SSR), including Mode A, Mode C, Mode S, and ADS-B.

Companies fielding triangulation and/or multilateration systems for SSR include Sensis Corporation (www.sensis.com), ERA (www.era.cz) and Rannoch Corporation (www.rannoch.com), the respective websites thereof all of which are incorporated herein by reference.

While SSR signals are used for multilateration on the 1090 MHz frequency, there are others that use TDOA processing of other aircraft signals on different frequencies. One of these is the VERA-E system manufactured by ERA a.s., of the Czech Republic, as illustrated in FIGS. 1-3 and 5, taken from the website www.omnipol.cz, incorporated herein by reference. FIG. 1 illustrates a portable VERA-E passive sensor as set up in the field. FIG. 2 is a cutaway view of the VERA-E sensor, illustrating multiple antennas. FIG. 3 illustrates a VERA-E sensor as set up in the field, concealed by camouflage.

The VERA-E system may be used to track aircraft over wide areas using broadband methods. Essentially the broadband aspect is achieved by using a series of antennas and receiver systems interconnected as illustrated in FIG. 5. Each sub system handles a subset of frequencies in an overall range that includes from below 1 GHz to over 20 GHz.

A typical output from the VERA-E system is as follows:
Real time display
1-5 seconds update rate
Target/track ID
Coordinates x, y, (and z for 3D system)
Radar signal parameters (PRI, PW, CF, . . . ) and radar type/operation modes
SIF/IFF (3/A, C, 1, 2) modes
Barometric altitude (100 feet resolution) derived from Mode C reply
Mode S address (24 bits) and altitude from Mode S (25 feet resolution)
Mode 4 (IFF) flag
TACAN/DME channel/frequency and mode (X,Y)
GPS time Aircraft systems that can be tracked using this type of system include Joint Tactical Information Distribution System (JTIDS) and Distance Measuring Equipment (DME). A good description of JTIDS is found at http://en.wikipedia.org/wiki/JTIDS. incorporated herein by reference. The JTIDS system is an L-band TDMA network radio system used by the United States armed forces and their allies to support data communications needs, principally in the air and missile defense community. It provides high-jam-resistance, high-speed, crypto-secure computer-to-computer connectivity in support of every type of military platform from Air Force fighters to Navy submarines.

JTIDS is one of the family of radio equipment implementing Link 16, which is a highly-survivable radio communications design to meet the most stringent requirements of modern combat. Link 16 equipment has proven, in detailed field demonstrations as well as in the AWACS and JSTARS deployment in Desert Storm, the capability of basic Link 16 to exchange user data at 115 kilobit/s, error-correction-coded. (Compare this to typical tactical systems at 16 kilobit/s, which also have to accommodate overheads in excess of 50% to supply the same transmission reliability.) While principally a data network, Link 16 radios can provide high quality voice channels and navigation services as accurate as any in the inventory. Every Link 16 user can identify itself to other similarly equipped platforms at ranges well beyond what Mark XII IFF systems can provide. Additionally, Link 16-equipped platforms capable of identification through other means (such as radar and TENCAP blue force tracking) can pass that "indirect" identification data as part of its SA exchange.

According to an article appearing at http://www.sinodefence.com on Sep. 24, 2006, also incorporated herein by reference, there is another manufacturer of broadband multilateration systems, in addition to those previously enumerated. That article stated that during the 5th China International Electronic Exhibition (CIDEX) held in Beijing in Apr. 2006, 14th Institute of China Electronic Technology Corporation (CETC) revealed its YLC-20 passive surveillance radar system, which appears to be similar to the VERA-E.

The article went on to say, "the YLC-20 is a passive surveillance radar system similar to the VERA-E system developed by ERA of the Czech Republic. Based on the 'Time Difference of Arrival Principle', the system locates the source of signal position in two or three dimensions by solving for the mathematical intersection of multiple hyperbolas based on the Time Difference Of Arrival (TDOA) between the signal reception at multiple sensors. Using two hyperbolas (three receivers) the system can obtain 2D target position, while using at minimum three hyperboloids (four receivers) the system can achieve full 3D target locating. Higher accuracy can be achieved by using more receivers."

Aircraft tracking may also be used as backup and validation for primary tracking systems. The use of triangulation or multilateration to provide an independent aircraft location is seen as a viable form of validation and back up to ADS-B. The FAA released two draft specifications relating to ADS-B and associated services in September 2006, listed below, both of which are incorporated herein by reference. These performance specifications do not require multilateration, but they provide performance requirements for the back up listed below and they provide guidance that multilateration may be used to provide the back up functions.

U.S. Department of Transportation, Federal Aviation Administration, Surveillance and Broadcast Services Program, Automatic Dependent Surveillance-Broadcast (ADS-B)/ADS-B Rebroadcast (ADS-R) Critical Services Specification, Draft, Version 0.30, 21 Sep. 2006.

U.S. Department of Transportation, Federal Aviation Administration, Surveillance and Broadcast Services Program, Traffic Information Service—Broadcast (TIS-B)/Flight Information Service—Broadcast (FIS-B), Essential Services Specification, Draft, Version 0.30, 21 Sep. 2006.

These specifications provide draft requirements, subject to industry feedback, for independent validation performance as follows:

The ADS-B Service shall determine the validation status of at least 99% of aircraft/vehicles within 10 seconds of generation of the initial ADS-B Report for that aircraft/vehicle.

The ADS-B Service shall declare ADS-B data from an aircraft/vehicle to be valid if the independent measurement differs from the reported position by less than or equal to 1 NM.

The ADS-B Service shall declare ADS-B data from an aircraft/vehicle to be invalid if the independent measurement differs from the reported position by greater than 1 NM.

The probability of erroneously invalidating ADS-B data shall be defined.

Thus, there clearly is a long felt need in the industry to employ ADS-B as a backup and/or validation for other tracking systems, as evidenced by the FAA draft specifications.

Surveillance sensors may be mounted in a number of locations. As noted in earlier filed applications by the assignee of the present application, such sensors may be located at an airport or off-site. Off-site installations may include, for example, cell phone towers or antenna placements. However, terrestrial-based forms of tracking traditionally suffer over large water areas, which constrains the positioning of sensors.

FIG. 4 illustrates a Prior Art six-meter NOMAD buoy with solar panels and communications equipment as used presently by the National Oceanic and Atmospheric Administration (NOAA). A selection of the type of buoys that may be used is provided on the website for the National Oceanic and Atmospheric Administration at:

www.ndbc.noaa.gov
www.ndbc.noaa.gov/mooredbuoy.shtml
www.ndbc.noaa.gov/images/Stations/6m.jpg all of which are incorporated herein by reference.

Different sized buoys for are used for deployment in various marine situations ranging from shallow water to deep water. Many of the buoys have power and communications available for installing equipment. According to NOAA, there are over 80 buoys deployed at various locations around the world. One example of such a buoy is the 6-meter diameter "NOMAD" buoy illustrated in FIG. 5. FIG. 6 illustrates an example of the range of available buoys used by NOAA.

In addition to sensors located on the ground or on marine vessels, sensors may also be located on aircraft or Unmanned Autonomous Vehicles (UAVs). Farmer et al., U.S. Pat. No. 7,123,169, issued Oct. 17, 2006 and incorporated herein by reference, entitled "Method and Apparatus for Collaborative Aggregate Situation Awareness" discloses gathering data from sensors located on multiple UAVs. The patent describes autonomous sensors that may proactively collect imagery on any vehicle that radiates a specific frequency. For example, an autonomous sensor may proactively collect imagery of ground moving target indicator (GMTI) tracks that are spaced closely together (which may mean an enemy convoy), or imagery of GMTI tracks that are moving toward friendly lines (which could be a sign of an enemy attack), or imagery of infrared (IR) hot spots detected with the IR sensor (that might be an enemy tank). An autonomous sensor may also listen for a signature sound or spore or scent, and fly upstream taking pictures of the source. The collaborative system can efficiently process requests and position the autonomous sensors at the right spot at the right time. This is achieved by the assignment of priorities to requesters, types of requests, and potential areas for requests.

Schneider, U.S. Pat. No. 6,910,657, issued Jun. 28, 2005 and incorporated herein by reference, discloses a system and method for locating a target and guiding a vehicle toward the target, describes time of arrival techniques for target location. Schneider states that time-of-arrival techniques are often employed to locate a radiating target, such as a Surface-to-Air Missile (SAM) battery. For example, three or more aircraft may time the arrival of electromagnetic energy emanating from the SAM battery. By measuring signal arrival time from the battery to the three or more aircraft, the location of the battery is determined. Clocks on the aircraft are synchronized via Global Positioning System (GPS) satellite clocks to enhance distance computation accuracy. Subsequently, a missile equipped with GPS/inertial guidance system is guided toward the measured position, i.e., GPS coordinates of the SAM battery.

The location of the missile during flight is measured by the on-board GPS/inertial guidance system to facilitate missile guidance. However, GPS guidance systems are susceptible to jamming, such as via jamming transmitters located near the target. In addition, GPS/inertial guidance systems often employ an expensive five element null-steering antenna. The null-steering antenna is capable of steering nulls to four jamming units. Consequently, use of more than four jamming units can successfully jam the accompanying GPS/inertial guidance system by overcoming the weak GPS signals from satellites.

Prior Art search and rescue operations for coastal applications have only recently implemented advanced technology to provide quick and accurate tracking capabilities for locating vessels in distress. In the Prior Art, a vessel in distress would attempt to contact the local Coast Guard on VHF channel 16, report their position, and wait for rescue. Unfortunately, since many mariners do not accurately know their position, such self-reporting often results in inaccurate data being transmitted, and as a result, delays in rescue attempts. In addition, false alarms by prank SOS announcements can waste valuable Coast Guard resources. Moreover, since channel 16 in many areas (e.g., Ft. Lauderdale) is rather busy, oftentimes Coast Guard personnel cannot hear broadcasts from vessels in distress, as the signals may be "stepped on" by local recreational boaters.

Traditional triangulation techniques may be utilized to locate mariners in distress, by measuring radio signal direction from at least two on-shore locations, and then triangulating an off-shore position. However, such a technique requires that the radio signal be on long enough for the on-shore receivers to fix on the signal, and moreover that the signal is not interrupted by other radio traffic. Weak or intermittent signals, which often occur when a vessel is in distress (e.g., low or no battery power, engine room awash, or the like), or when the person in distress is using a hand-held portable radio, may be difficult to track.

To correct some of these problems, the U.S. Coast Guard offers MF/HF radiotelephone service to mariners as part of the Global Marine Distress and Safety System. This service, called digital selective calling (DSC), allows mariners to instantly send an automatically formatted a distress alert to the Coast Guard or other rescue authority anywhere in the world. Digital selective calling also allows mariners to initiate or receive distress, urgency, safety and routine radiotelephone calls to or from any similarly equipped vessel or shore station, without requiring either party to be near a radio loudspeaker. All new VHF and HF radiotelephones have DSC capability.

On Feb. 1, 1999, the Safety of Life at Sea (SOLAS) Convention, a treaty document, required all passenger ships and most other ships 300 grt and larger on international voyages, including all cargo ships, to carry DSC-equipped radios. Ships were allowed to turn off their 2182 kHz radio listening watch on that date. The International Maritime Organization has postponed indefinitely plans to suspend this VHF watch on ships. It had originally planned to suspend this watch on Feb. 1, 2005.

Because of the safety problems that lack of communications interoperability would cause between SOLAS-regulated vessels (mostly cargo ships) and other vessels (recreational boaters, commercial fishing vessels, etc.), the Coast Guard petitioned the Federal Communications Commission in 1992 to require all marine radios made or sold in the U.S. to have a DSC capability. The Coast Guard had also asked the Radio Technical Commission for Maritime Services (RTCM), a non-profit professional organization, to develop a standard, which would allow incorporation of DSC in a marine radio without affecting the low-end market price of that radio for recreational boaters. The FCC solicited comments on that petition in 1992 and 1993, and prepared a Notice of Proposed Rulemaking on that and other maritime radiocommunications matters in early 1994. The FCC requested comments concerning that rulemaking from May to November 1995. On 27 Jun. 1997, the FCC adopted a Report and Order requiring radios type accepted on or after 17 Jun. 1999 to include this minimum DSC capability.

The International Telecommunications Union Sector for Radiocommunications has indicated that excessive test calls on MF/HF DSC distress and safety frequencies are overloading the system to the point where interference to distress and safety calls has become a cause for concern. To minimize possible interference, live testing on DSC distress and safety frequencies with coast stations should be limited to once a week as recommended by the International Marine Organization.

To date, only a limited number of DSC receivers have been installed by the Coast Guard. Many USCG Group offices operate MF DSC on a trial basis. The Coast Guard plans to declare a Sea Area A2 (have an operational MF DSC service) for the Contiguous US coast and Hawaii. The US currently does not have a declared Sea Area A2.

All DSC-equipped radios, and most GPS receivers, have an NMEA 0183 two-wire data interface connector. That NMEA interface allows any model of GPS to be successfully interconnected to any model of radio, regardless of manufacture. Although NMEA has no standard for the type of connector used, many if not most DSC and GPS receiver manufactures use bare wire connections. These wires are simply connected between the radio and the GPS by twisting the wires (preferably solder) and tape (preferably waterproof heat shrink tubing).

In operation, the boater presses a button (usually mounted on the back of the microphone, underneath a safety cover) to declare a distress condition. The DSC-equipped VHF radio then transmits the GPS-based location of the vessel digitally to a DSC-equipped receiver station, and rescue personnel can be dispatched to the distress site.

Thus, the DSC system suffers from a number of systemic and implementation problems. Many boaters have older radios without DSC capability, and it will be several years, if not decades, before all of these older-style radios are purged from the marketplace, as many recreational boaters do not see implementing DSC as a priority, and for many boaters, the cost of installing a new DSC radio is deemed excessive. In addition, many older GPS systems do not have the two-wire interface needed to connect to a DSC-compatible radio. Further, many boaters have not taken the time to make such connections, and, as noted above, since no standard connector exists, many connections are bare-wire type, which may not be reliable in a salt-water environment, or may be connected improperly, or become disconnected due to vibration and the like.

Even if connected, there is no guarantee the system will work. Extensive testing if DSC signals, as previously noted, has resulted in clogging of the DSC system, so boaters are not encouraged to test their system to insure it works properly. Moreover, boaters are encouraged to register their DSC-equipped vessels with the Coast Guard, such that a DSC emergency signal can be matched to a boating database to identify the vessel in distress. Most recreational boaters are unaware of this registration process, and few take advantage of it.

As a result, the DSC system suffers from the same implementation problems as many retrofit aircraft systems, such as collision avoidance (e.g., TCAS) or terrain sensing systems. These systems rely upon individual vehicle owners to install and maintain equipment to make the system operational. The system also will take time for such equipment to make its way though the existing vehicle inventory. Aircraft owners, may be required to install such equipment, and the safety concerns may compel many owners to install such equipment, even if not required to do so. However, unlike aircraft owners, most recreational boating owners are more lax about installation and maintenance of such equipment, and thus implementing and keeping installed DSC systems operational is more of a problem. A better solution would be to provide a vessel tracking system, which does not require recreational boaters to install and maintain new equipment, or one that allows for less complex equipment to be used, or to provide such a vessel tracking system as an adjunct to the DSC system.

In addition to the applications noted herein, multilateration and triangulation systems may be used for correlation with vibration, noise, audio, video, and other Information. Other sources of information that may be correlated with aircraft or vehicle track information include audio and video data. Currently there are many systems that correlate this information used for environmental management including those implemented by Rannoch Corporation (www.rannoch.com), Lochard (www.lochard.com), Bruel and Kjaer (www.bksv.com), BAE Systems and others, the respective websites thereof all being incorporated herein by reference. These systems may correlate the data in order to determine and identify which specific aircraft generated noise events or noise levels. Vibration monitoring may also be employed by these systems to track lower frequency events such as engine run-ups at airports. Although it has been discussed in the industry, airport noise monitoring systems have not generally employed methods to analyze the spectral content of aircraft noise for the purposes of classification (e.g., to distinguish between a jet or a turboprop).

In the example illustrated in FIG. 7 is from the BAE TAMIS™ product to compute the point of closest approach of an aircraft. PCA statistics include:
  Slant distance,
  Ground distance,
  Aircraft position and altitude,
  Date and time of the PCA,
  Elevation angle from the PCA center point to the flight
  Aircraft ground heading.

FIG. 8 illustrates a flight track that is selected from point of closest approach. FIGS. 9 and 10 illustrate a typical NOMS layout where the aircraft tracks are illustrated on a GIS map along with the locations of noise monitors. FIG. 10 illustrates the actual recorded noise level at each of the monitors on the GIS map. FIG. 11 illustrates a typical noise event for an aircraft as a Single Event Level or "SEL."

Primary radar is, of course, an active element, and if used as part of a surveillance configuration it is no longer covert. However, there are many opportunities in fielding passive systems to integrate feeds from existing radars to improve overall surveillance. Radar types range from long range systems covering several hundred miles to high frequency systems that cover only a few hundred meters, including:
  Long range ASRS-4 built by Westinghouse/Northrop Grumman (www.ngc.com)
  Terminal ASR-8, 9, 11, 12 built by Raytheon (www.raytheon.com) and Northrop Grumman
  Surface Ku band radar by Cardion/Northrop Grumman
  Surface X band radars including those built by Terma (www.terma.com), Sensis (www.sensis.com), and Thales (www.thalesatm.com)
  Lower range, higher frequency radar such as the Tarsier™ by QinetiQ and the 77 GHz radar produced by Navtech (www.nav-tech.com).

Thus, it also remains a requirement in the art to fuse data from various surveillance sources, including primary and secondary radars, passive tracking systems, and the like, to create a robust and verified flight track or vehicle track, with redundant data inputs.

SUMMARY OF THE INVENTION

The present invention provides a number of techniques to use multilateration and triangulation techniques for coastal defense, homeland security, search and rescue, in both coastal and mountainous terrain, as well as ADS-B back-up and validation.

While the Prior Art, such as the Schneider Patent discussed previously discloses limiting placement of the receivers for time difference of arrival measurement to three or more aircraft and/or spacecraft, in the present invention, a combination of receivers may be positioned on the ground, on aircraft, or marine vessels and buoys.

BRIEF DESCRIPTION OF THE DRAWINGS

FIG. 5 is a block diagram illustrating how the broadband aspect of the VERA-E system is achieved by using a series of interconnected antennas and receiver systems.

DETAILED DESCRIPTION OF THE INVENTION

Figure 2:
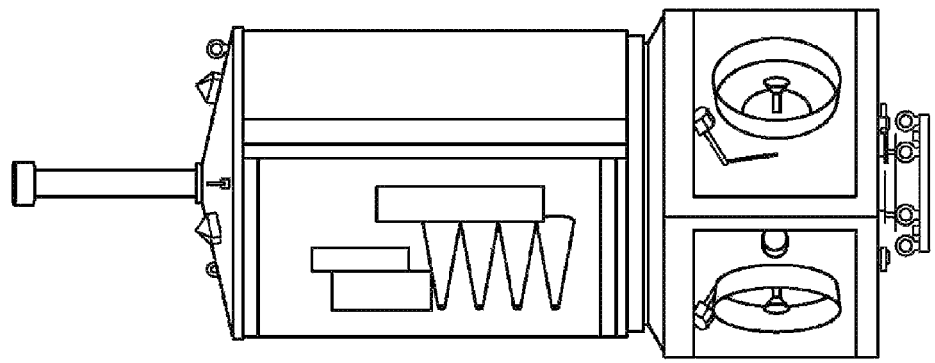
FIG. 2 is a cutaway view of the VERA-E sensor, illustrating multiple antennas.
Figure 1:
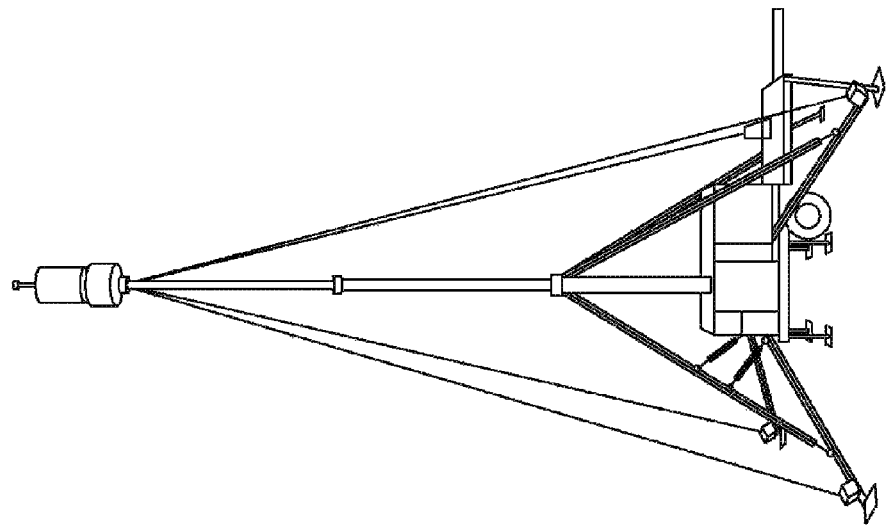
FIG. 1 illustrates a portable VERA-E passive sensor as set up in the field.
Figure 4:
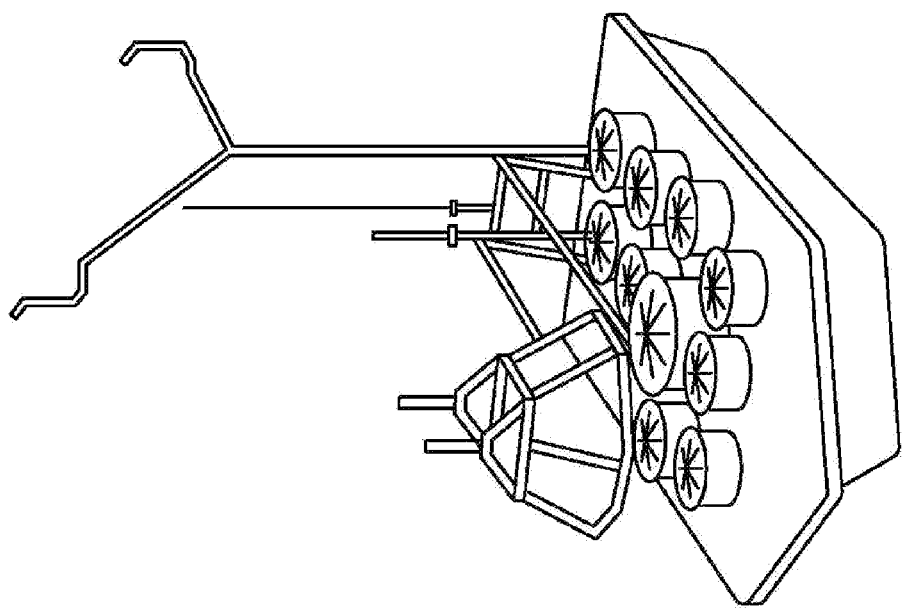
FIG. 4 illustrates a six-meter NOMAD buoy with solar panels and communications equipment.
Figure 3:
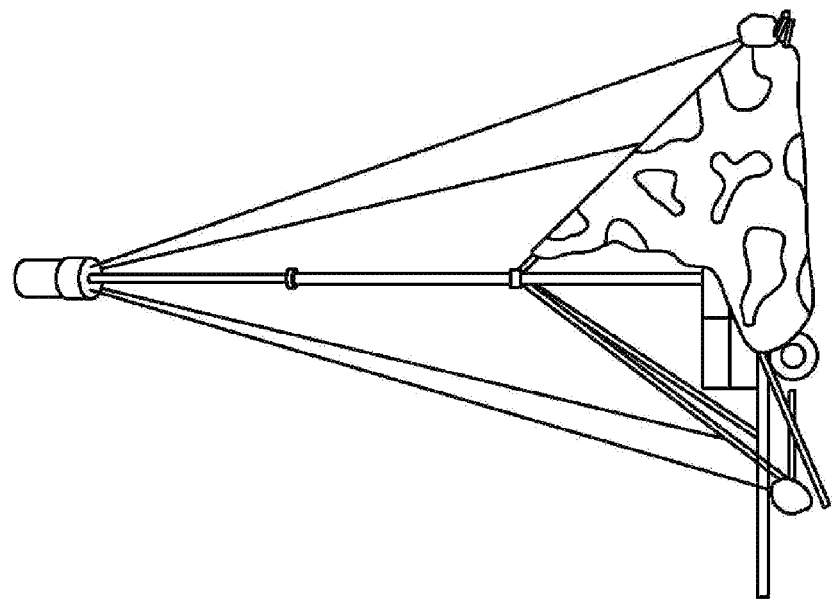
FIG. 3 illustrates a VERA-E sensor as set up in the field, concealed by camouflage.
Figure 6:
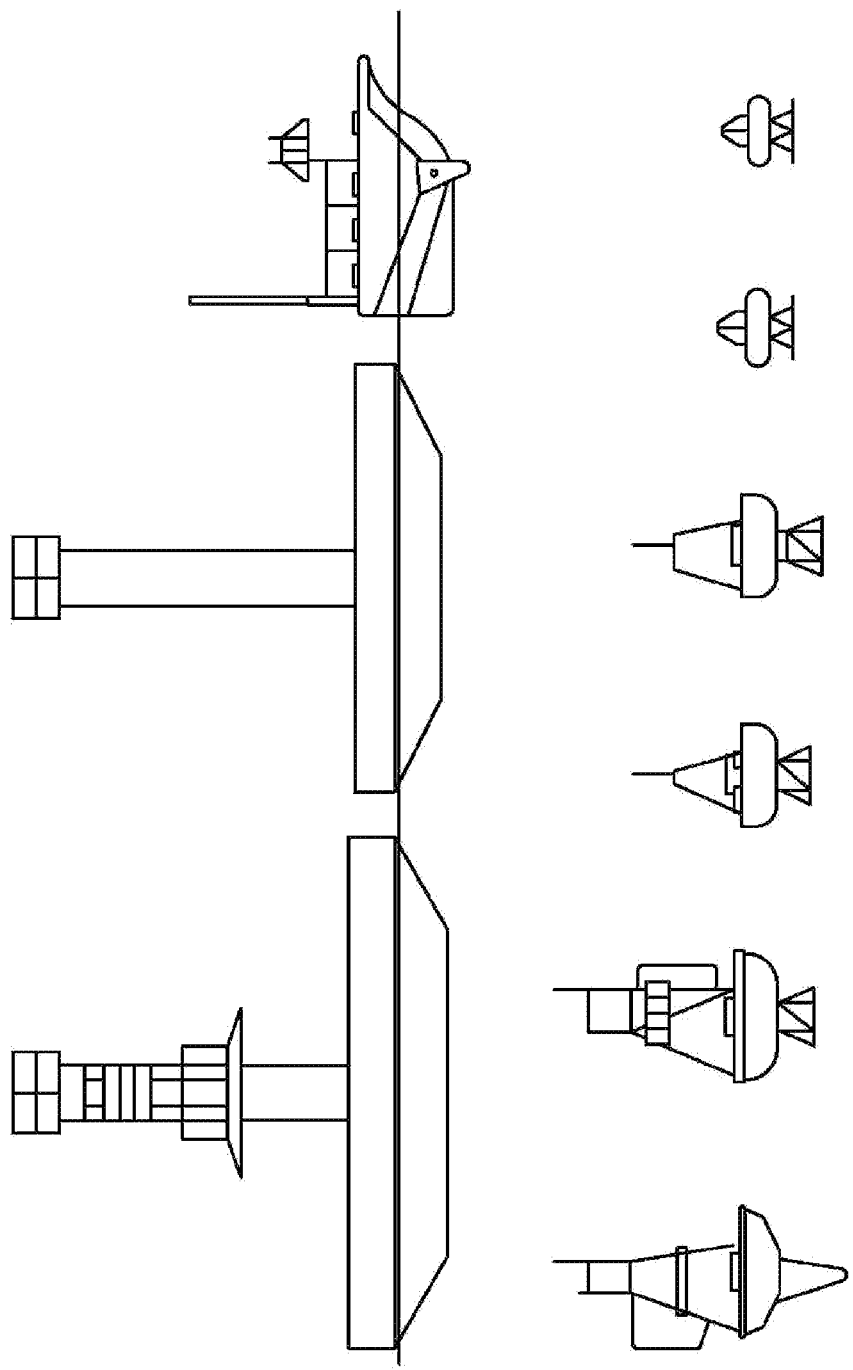
FIG. 6 illustrates an example of the range of available buoys.
Figure 7:
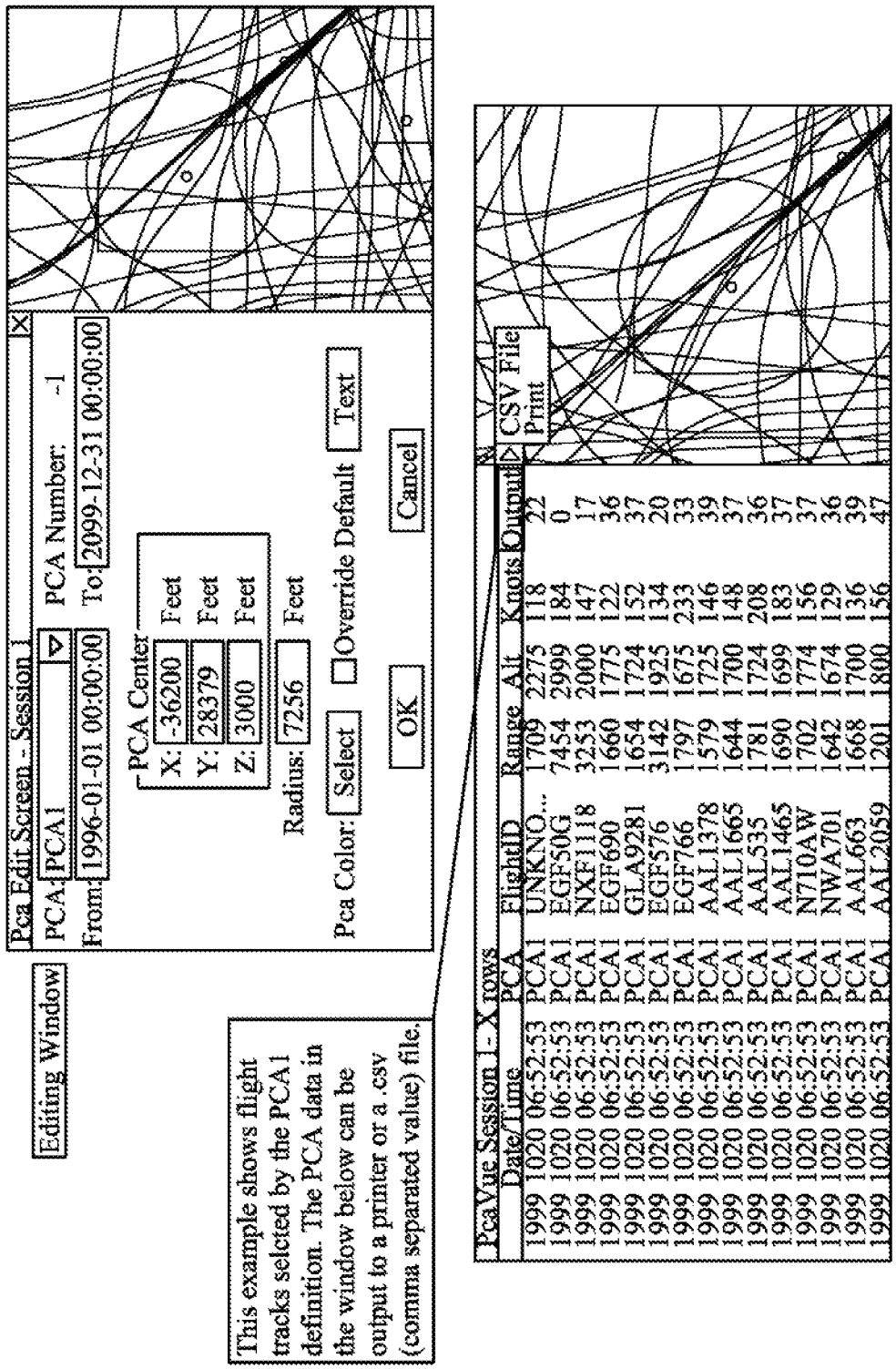
FIG. 7 illustrates and example of the BAE TAMIS™ product to compute the point of closest approach of an aircraft.
Figure 8:
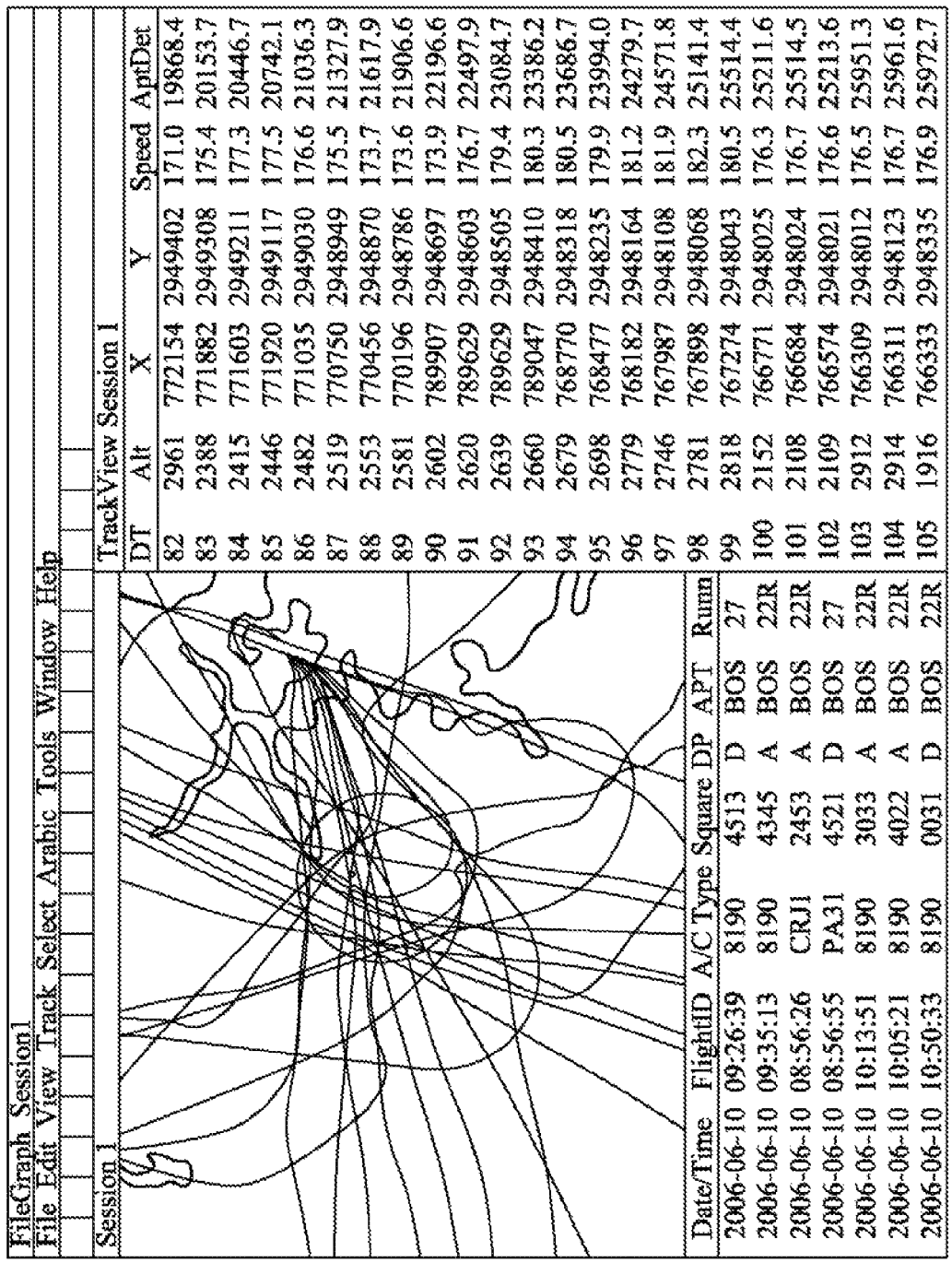
FIG. 8 illustrates a flight track that is selected from point of closest approach.
Figure 9:
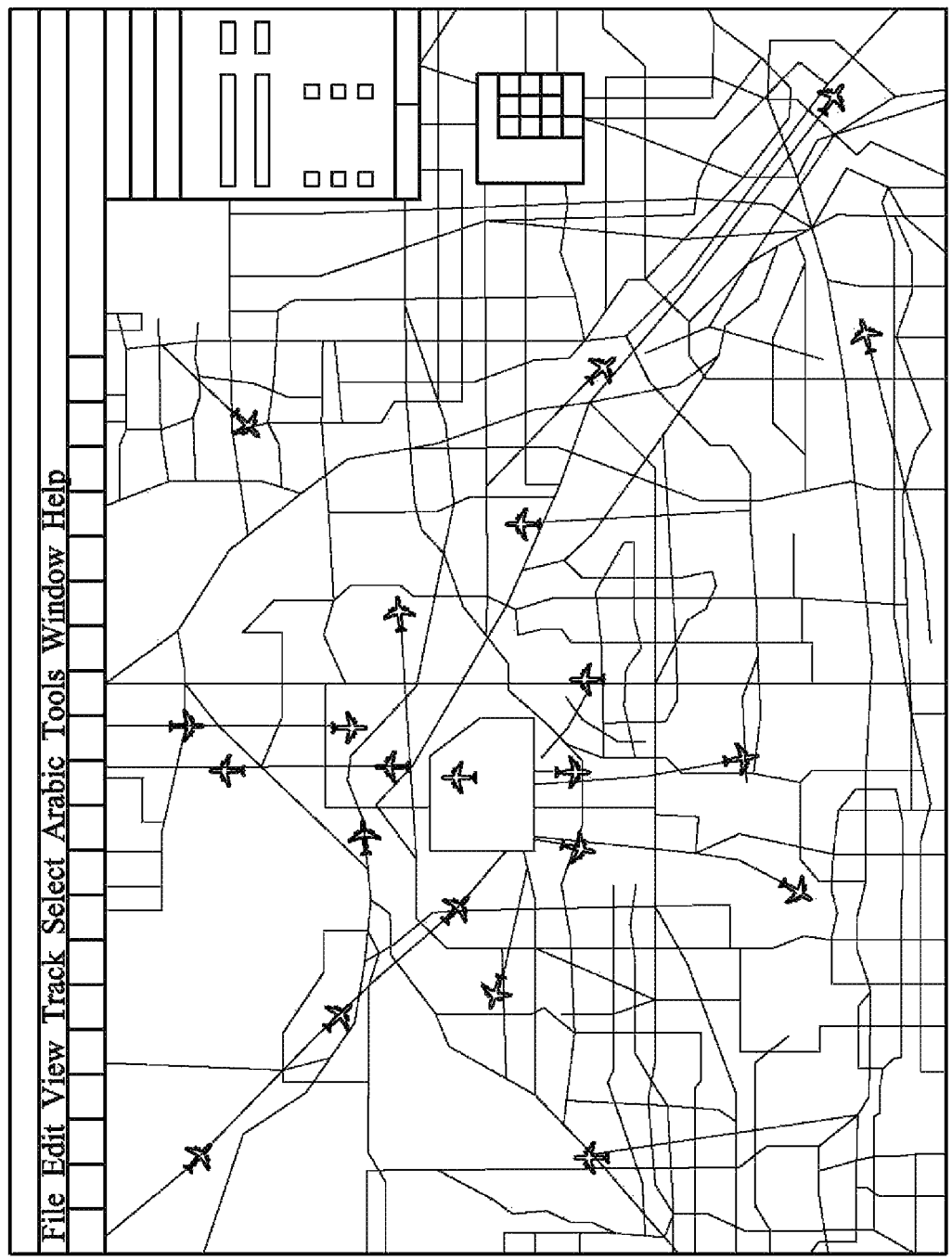
FIG. 9 illustrates a typical NOMS layout where the aircraft tracks are illustrated on a GIS map along with the locations of noise monitors.
Figure 10:
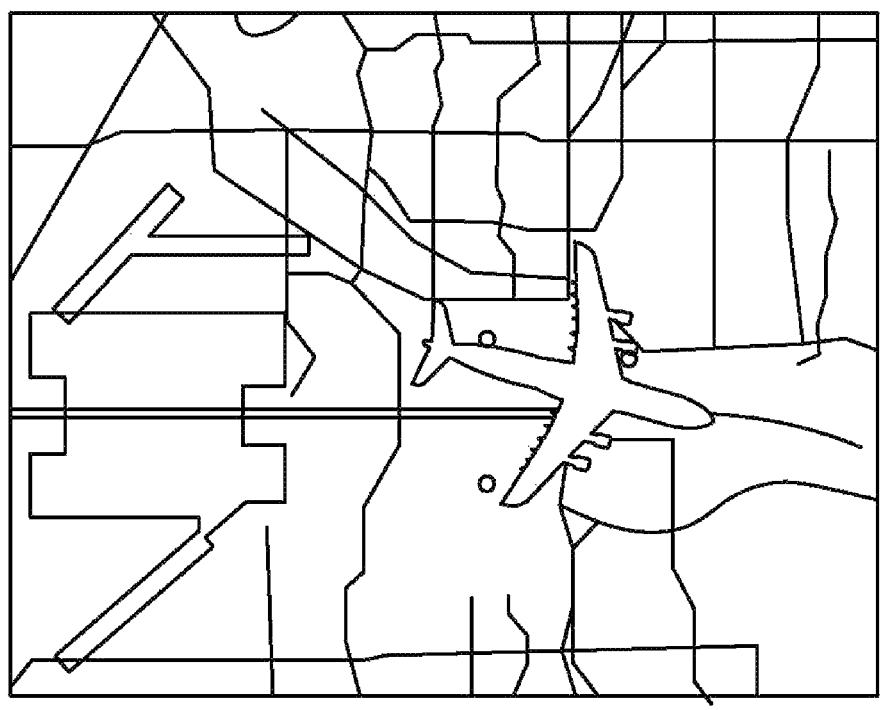
FIG. 10 illustrates the actual recorded noise level at each of the monitors on the GIS map.
Figure 11:
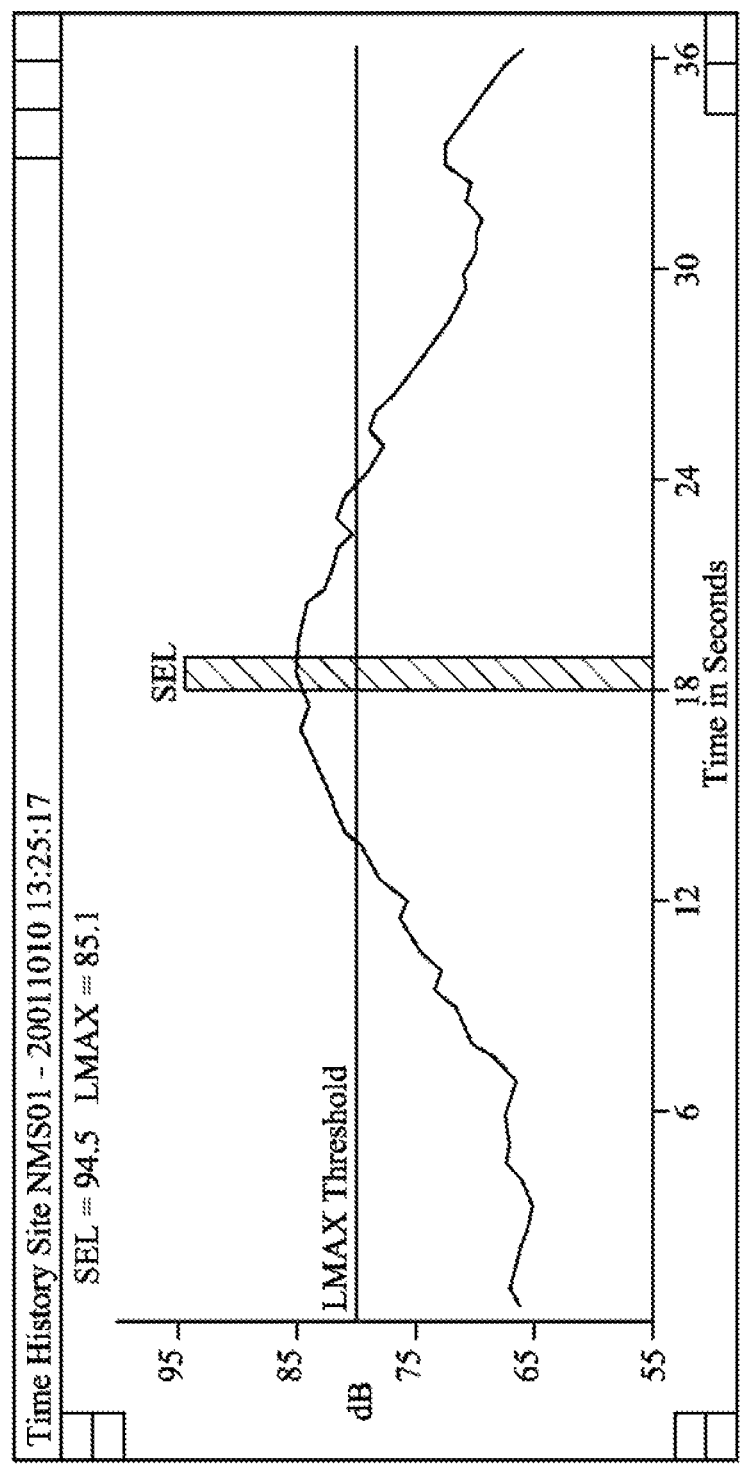
FIG. 11 illustrates a typical noise event for an aircraft as a Single Event Level or "SEL."
Figure 12:
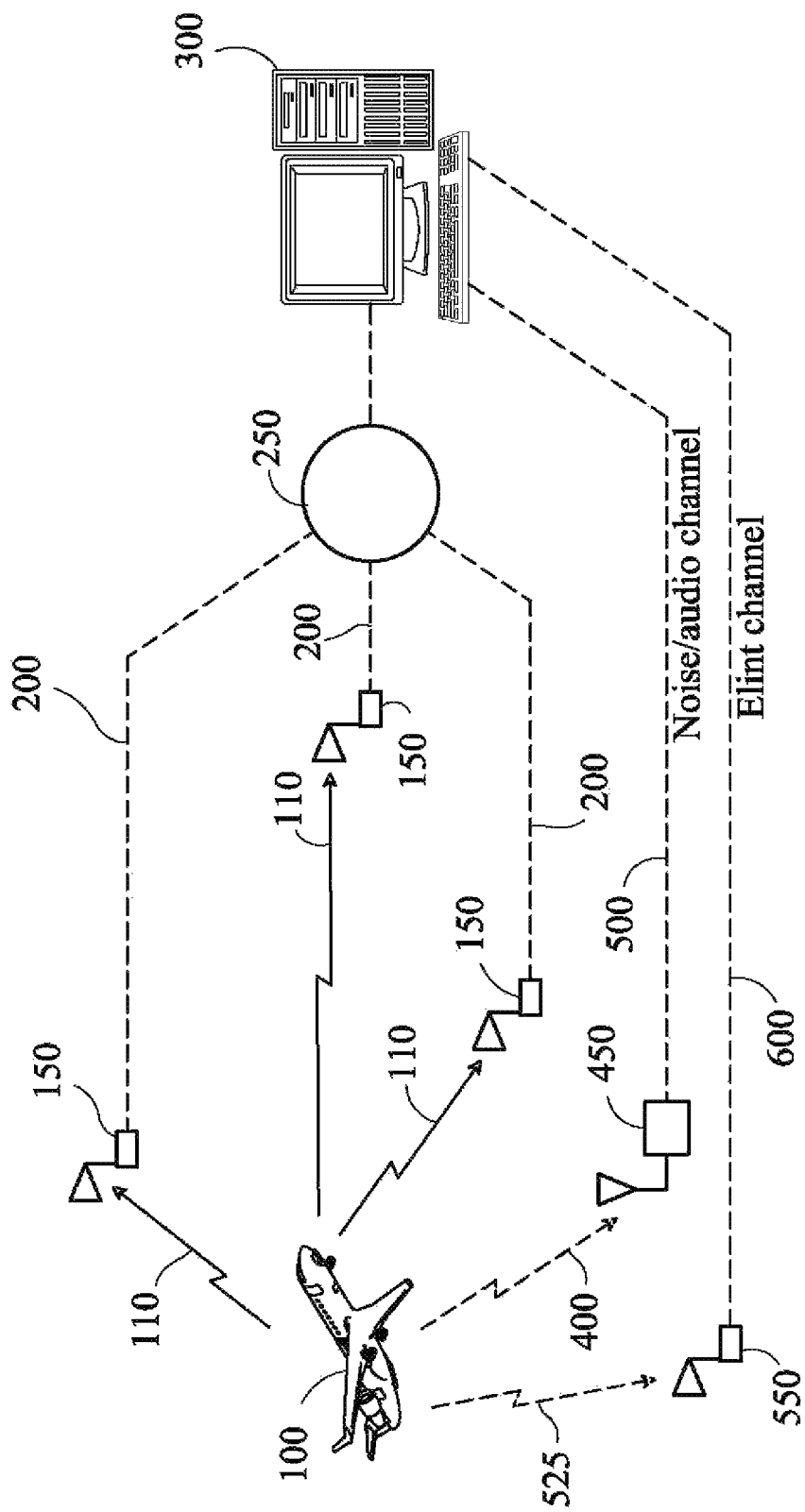
FIG. 12 is a block diagram illustrating the Coastal Defense and Homeland Security, Search and Rescue (Coastal and Mountainous Terrain) and ADS-B Back up and Validation of the present invention.

FIG. 12 is a block diagram illustrating the Coastal Defense and Homeland Security, Search and Rescue (Coastal and Mountainous Terrain) and ADS-B Back up and Validation of the present invention. In this embodiment there are essentially three channels of data from the aircraft 100 analyzed by the system in real time, one is flight tracking data based on multilateration of aircraft emitted signals 110 including transponder, DME, JTIDS, and various other pulse emitters located on the aircraft. The emitter signals are then time-stamped, either at the sensor 150 or at the central server 250 to perform TDOA analysis and pinpoint the location of the aircraft using multilateration techniques. Similarly, each sensor 150 may detect the aircraft's annunciated position as would be used by Automatic Dependent Surveillance Broadcast (ADS-B). The sensors 150 may be stationary and located on the ground, towers, or at sea on buoys, or they may be dynamic and located on marine vessels, aircraft, or UAVs.

The other two channels illustrated in this embodiment are noise/audio 400, 450 and electronic fingerprinting or electronic intelligence 500, 550. Other parallel channels may be added including video, infrared, and primary radar. As aircraft 100 approaches a given area, sound (noise) made by aircraft 100 may be detected by microphones, or very low audio frequencies produced by aircraft 100 may be detected by vibration detectors. This noise or sound data may be transferred from the sensor 450 to a processor 300 either digitally or on analog form using a variety of communications media 500.

The location of the audio or vibration, as determined by an array of microphones 450 may then associated with the location of the aircraft as determined by multilateration 250. Furthermore, the characteristics of the audio, such as spectra, may be used to help classify the aircraft type, for example a turbo prop or a jet aircraft. The audio sensors 450 may or may not be located with the aircraft tracking sensors 150 which may include locations that are fixed or dynamic, such as cell towers, on tops of buildings, or at sea on buoys or other vessels.

Electronic intelligence channel 550 receives all emissions 525 from aircraft 100, and passes them through data path 600 to processor 300 for identification of the emitter type. Aircraft emitter type may be identified at the sensor 550 or at the processor 300 using a variety of transmission media, including fiber, radio link, analog or digital landline 600. From this data, electronic fingerprinting can be performed, and this and other intelligence data fused with other data sources in processor 300 to provide a redundant tracking and identification system for aircraft and other vehicles. In addition, such fused data can be used to track aircraft, vessels, and other vehicles for emergency and rescue operations.

Electronic fingerprinting is the ability to analyze the received signals for source identity in order to associate an estimate of emitter type with aircraft track. The emitter type can then be associated with a specific aircraft type. Thus, receiver 550 in FIG. 12 may comprised, for example, and embodiment of the VERA E system Receiver 550 thus has a capacity of up to 200 automatically tracked targets. Measured signal parameters include are as follows:

| | |
|---|---|
| TOA/TDOA: | 25 ns resolution |
| Pulse width: | 0.15-130 us with 25/200 ns resolution |
| Carrier frequency: | 1 MHz resolution in 1-18 GHz range |
| Pulse repetition interval: | 25/200 ns resolution |
| Pulse amplitude: | 3 dB resolution |

The VERA E system can operate with various signal types, including conventional, staggered/jitter PRI, frequency agile, MPRF/HPRF pulse Doppler, intra-pulse modulated (P/FMOP). Pulse analysis may be performed by independent signal analysis channel. An electronic parameter list may be provided with precise measured signal parameters. The system also offers intra-pulse analysis as well as military Mode 1 and Mode 2 target identification.

By combining these various data source elements, a system may be employed to track vessels, aircraft, and other vehicles for emergency (e.g., vessel in distress) or security purposes. Portable antenna systems such as the VERA-E system may be employed for specific tracking operations. Antennas may also be placed on buoys, such as existing NOAA weather buoys, navigation buoys or dedicated tracking buoys, to provide tracking information and target identification and location.

In addition, the use of such multiple sources may be employed as a back-up for conventional surveillance radar or ADS tracking systems or the like. Data from the present invention may be fused with such tracking data, and discrepancies noted which may indicate whether underlying tracking data is inaccurate or whether a sensor, sensors, or systems are malfunctioning.

For example, multilateration sensors 150 receive signals from aircraft 100 indicating the aircraft is small general aviation aircraft (e.g., transponder spoofing) but noise sensors indicate that a large jetliner is in the same location and following the same track, authorities may alerted that a possible terrorist attack is in progress. Alternately, such redundant data could indicate transponder errors, tracking errors or sensor errors, or the like in primary or secondary tracking systems. Electronic fingerprinting and intelligence data from system 550 may be used to similarly verify location and identification of an aircraft or other vehicle or vessel.

For marine applications, sensors 150, 450, and 550 may be located on land, or on buoys or other waterborne locations to provide for better tracking over water. Distress signals and other electronic signals from boats or other vessels may be used to track location of such vessels for search and rescue applications. In addition, other signals (such as cell phone signals and other electrical signals) may be used to track vessels for surveillance purposes (e.g., drug smuggling, illegal immigration, and the like).

Portable antenna, such as the VERA-E system 550 may be employed for search and rescue operations, for example, to track climbers stuck on a mountain, by detecting and multilaterating cellular telephone signals or other signals or distress signals or the like. The protability of such a system, along with the capability to integrate such signals into the overall system, allows for rapid deployment of the system to specific locations while maintaining a central tracking ability and the integration of multiple tracking sources.

Unmanned Aerial Vehicles (UAVs) may be employed to track the location of a target. UAVs may be provided with receiving antennas to receive signals from aircraft, ships, vessels in distress, individuals, or other fixed or moving targets. The location of each UAV may be determined using an on-board Global Positioning System (GPS), inertial navigation, or multilateration of signals from the UAV itself by ground stations—or a combination of such techniques.

Once the location of the UAVs (or relative location of a UAV relative to other sensors and/or UAVs) is known, it is possible to determine the location of a target using multilateration Time Difference of Arrival (TDOA) techniques to determine the location of the target. Using this information, the UAV may be directed toward the target, in some embodiments.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method of tracking a target, comprising the steps of:
   receiving, at a plurality of sensors at a plurality of locations, a plurality of signals from the target on a wide frequency band of one or more of aircraft, vehicle, vessel, and fixed target emitted signals;
   time-stamping the plurality of signals with time stamps indicating when the signals arrive at the plurality of locations; and
   determining position of the target using time difference of arrival of the plurality of signals at the plurality of locations,
   wherein one or more of the sensors is installed at one or more of a fixed location, buoy-mounted, ship mounted, aircraft mounted or unmanned aerial vehicle mounted.

2. The method of claim 1, wherein the target is one or more of an aircraft, vehicle, vessel, or fixed target.

3. The method of claim 1, further comprising the steps of:
receiving, from the target, electronic intelligence data to categorize emitter type of the target; and
correlating the target track with electronic intelligence data to correlate emitter type to the tracked target.

4. The method of claim 3, wherein the emitter comprises an emitter located on one or more of aircraft, vehicles, marine vessels, and a surface to air missile (SAM) battery.

5. The method of claim 4, wherein the emitter comprises one or more of JTIDS, IFF, DME, TACAN, VAT, SSR, Mode S, ADS-B, weather radar, jamming radar, communications, electromagnetic pulses, and pulse emitters.

6. The method of claim 1, further comprising the steps of:
tracking the target using Automatic Dependent Surveillance (ADS); and
validating an ADS track using the target position determined using time difference of arrival of the plurality of signals at the plurality of locations.

7. The method of claim 3, further comprising the step of:
correlating of the emitter location with information including one or more of noise levels, noise spectra, vibration, audio, video, primary radar, passive radar, secondary radar and infra red imagery.

8. The method of claim 7, further comprising the step of:
categorizing target type from one or more of noise levels, noise spectra, vibration, audio, video, primary radar, passive radar, secondary radar and infra red imagery.

9. The method of claim 1, wherein the step of time-stamping the plurality of signals with time stamps indicating when the signals arrive at the plurality of locations further comprises the steps of:
receiving a time clock value from an individual sensor, and
time stamping a signal received at the sensor with a time clock value from the sensor.

10. The method of claim 1, wherein the step of time-stamping the plurality of signals with time stamps indicating when the signals arrive at the plurality of locations further comprises the steps of:
receiving a time clock value from a central server; and
time stamping a signal received at the sensor with a time clock value from the central server.

11. The method of claim 1, further comprising the step of:
transmitting one or more of time stamp, timing, tracking and identification data from the plurality of sensors, to a central processor over one or more of analog line, digital line, internet, Ethernet, wireless, fiber, and microwave link,
wherein said step of determining position of the target using time difference of arrival of the plurality of signals at the plurality of locations comprises calculating position of the target at the central processor using data from the plurality of sensors.

12. The method of claim 11, wherein the sensors and the central processor are one or more of a fixed system, deployable, and portable.

13. A system for tracking a target, comprising:
means for receiving, at a plurality of sensors at a plurality of locations, a plurality of signals from the target on a wide frequency band of one or more of aircraft, vehicle, vessel, and fixed target emitted signals;
means for time-stamping the plurality of signals with time stamps indicating when the signals arrive at the plurality of locations; and
means for determining position of the target using time difference of arrival of the plurality of signals at the plurality of locations,
wherein one or more of sensors is installed at one or more of a fixed location, buoy-mounted, ship mounted, aircraft mounted or unmanned aerial vehicle mounted.

14. The system of claim 13, wherein the target is one or more of an aircraft, vehicle, vessel, or fixed target.

15. The system of claim 13, further comprising:
means for receiving, from the target, electronic intelligence data to categorize emitter type of the target; and
means for correlating the target track with electronic intelligence data to correlate emitter type to the tracked target.

16. The system of claim 15, wherein the emitter comprises an emitter located on one or more of aircraft, vehicles, marine vessels, and a surface to air missile (SAM) battery.

17. The system of claim 16, wherein the emitter comprises one or more of JTIDS, IFF, DME, TACAN, VAT, SSR, Mode S, ADS-B, weather radar, jamming radar, communications, electromagnetic pulses, and pulse emitters.

18. The system of claim 13, further comprising:
means for tracking the target using Automatic Dependent Surveillance (ADS); and
means for validating an ADS track using the target position determined using time difference of arrival of the plurality of signals at the plurality of locations.

19. The system of claim 15, further comprising:
means for correlating of the emitter location with information including one or more of noise levels, noise spectra, vibration, audio, video, primary radar, passive radar, secondary radar and infra red imagery.

20. The system of claim 19, further comprising:
means for categorizing target type from one or more of noise levels, noise spectra, vibration, audio, video, primary radar, passive radar, secondary radar and infra red imagery.

21. The system of claim 13, wherein the means for time-stamping the plurality of signals with time stamps indicating when the signals arrive at the plurality of locations further comprises:
means for receiving a time clock value from an individual sensor, and
means for time stamping a signal received at the sensor with a time clock value from the sensor.

22. The system of claim 13, wherein the means for time-stamping the plurality of signals with time stamps indicating when the signals arrive at the plurality of locations further comprises:
means for receiving a time clock value from a central server; and
means for time-stamping a signal received at the sensor with a time clock value from the central server.

23. The system of claim 13, further comprising:
means for transmitting one or more of time stamp, timing, tracking and identification data from the plurality of sensors, to a central processor, said means for transmitting including one or more of analog line, digital line, interne, Ethernet, wireless, fiber, and microwave link,
wherein said means for determining position of the target using time difference of arrival of the plurality of signals at the plurality of locations comprises means for calculating position of the target at the central processor using data from the plurality of sensors.

24. The system of claim 13, wherein the sensors and the central processor are one or more of a fixed system, deployable, and portable.

* * * * *